(12) United States Patent
Kim (10) Patent No.: US 10,605,484 B2
(45) Date of Patent: Mar. 31, 2020

(54) LATENT-HEAT EXCHANGER FOR HOT-WATER HEATING AND CONDENSING GAS BOILER INCLUDING SAME

(71) Applicant: Kyungdong Navien Co., Ltd., Pyeongtaek, Gyeonggi-Do (KR)

(72) Inventor: Young Mo Kim, Gyeonggi-do (KR)

(73) Assignee: Kyungdong Navien Co., Ltd., Pyeongtaek, Gyeonggi-do (KR)

( * ) Notice: Subject to any disclaimer, the term of this patent is extended or adjusted under 35 U.S.C. 154(b) by 0 days.

(21) Appl. No.: 15/258,122

(22) Filed: Sep. 7, 2016

(65) Prior Publication Data

US 2017/0059205 A1    Mar. 2, 2017

Related U.S. Application Data

(63) Continuation of application No. PCT/KR2015/002459, filed on Mar. 13, 2015.

(30) Foreign Application Priority Data

Mar. 17, 2014 (KR) .................. 10-2014-0031092

(51) Int. Cl.
| | | |
|---|---|---|
| *F24H 8/00* | (2006.01) | |
| *F28D 9/00* | (2006.01) | |
| *F24D 17/00* | (2006.01) | |
| *F24D 3/02* | (2006.01) | |
| *F24H 1/38* | (2006.01) | |

(Continued)

(52) U.S. Cl.
CPC ............... *F24H 8/00* (2013.01); *F24D 3/02* (2013.01); *F24D 17/0078* (2013.01); *F24H 1/38* (2013.01); *F28D 9/0043* (2013.01); *F28D 21/0007* (2013.01); *F28F 3/046* (2013.01); *Y02B 30/102* (2013.01)

(58) Field of Classification Search
CPC .................................. F24H 8/00; F28D 9/0093
USPC .......................................................... 237/59
See application file for complete search history.

(56) References Cited

U.S. PATENT DOCUMENTS

| | | | | |
|---|---|---|---|---|
| 2,952,444 A | * | 9/1960 | Jenssen | .................. F28F 3/083 |
| | | | | 165/167 |
| 3,537,165 A | * | 11/1970 | Kemp | .................. F28D 9/0043 |
| | | | | 165/148 |

(Continued)

FOREIGN PATENT DOCUMENTS

| | | |
|---|---|---|
| JP | 2010-101524 A | 5/2010 |
| KR | 10-0645734 B1 | 11/2006 |

(Continued)

OTHER PUBLICATIONS

Takeda, et al, JP 2010-101524 A English machine translation, May 6, 2010.*

*Primary Examiner* — Grant Moubry
*Assistant Examiner* — Phillip Decker
(74) *Attorney, Agent, or Firm* — Mintz Levin Cohn Ferris Glovsky and Popeo, P.C.; Steven M. Jensen (57) ABSTRACT

A latent-heat exchanger comprising an upper heat exchange unit in which a plurality of circulating-heating-water heat exchange units having a circulating-heating-water flow channel formed therein and a lower heat exchange unit disposed on the lower side of the upper heat exchange unit, in which a plurality of direct-water heat exchange units having a direct-water flow channel formed therein is provided.

3 Claims, 10 Drawing Sheets

(51) Int. Cl.
   *F28D 21/00*     (2006.01)
   *F28F 3/04*      (2006.01)

(56) References Cited

U.S. PATENT DOCUMENTS

| | | | | |
|---|---|---|---|---|
| 4,002,201 | A * | 1/1977 | Donaldson | F28D 1/0333 165/140 |
| 4,081,025 | A * | 3/1978 | Donaldson | F28D 9/0093 165/140 |
| 4,327,802 | A * | 5/1982 | Beldam | F28D 1/0333 165/153 |
| 4,592,414 | A * | 6/1986 | Beasley | F28D 1/0333 165/153 |
| 5,180,004 | A * | 1/1993 | Nguyen | F28D 9/0093 165/140 |
| 5,462,113 | A * | 10/1995 | Wand | F28D 9/0093 165/140 |
| 5,855,240 | A * | 1/1999 | Farrell | F28D 1/0341 165/152 |
| 5,884,696 | A * | 3/1999 | Loup | F28D 1/0333 165/140 |
| 6,230,787 | B1 * | 5/2001 | Koga | F25B 39/022 165/144 |
| 6,360,817 | B1 * | 3/2002 | Brochin | B60H 1/00328 165/140 |
| 6,510,893 | B1 * | 1/2003 | Naji | F28D 1/0333 165/135 |
| 7,353,781 | B2 * | 4/2008 | Jung | F24H 8/006 122/18.1 |
| 8,220,529 | B2 * | 7/2012 | Kim | F24H 8/00 122/235.16 |
| 2002/0148415 | A1 * | 10/2002 | Manley | B21D 53/04 122/40 |
| 2002/0185264 | A1 * | 12/2002 | Halt | F28D 15/0233 165/104.33 |
| 2003/0079871 | A1 * | 5/2003 | Samy | F25B 39/022 165/174 |
| 2005/0229871 | A1 * | 10/2005 | Robertson | F24H 8/00 122/32 |
| 2007/0199687 | A1 * | 8/2007 | Richter | F28D 1/0325 165/153 |
| 2012/0210746 | A1 * | 8/2012 | Kadle | F28D 9/0093 165/166 |
| 2014/0060458 | A1 * | 3/2014 | Fujimoto | F24H 9/2035 122/14.3 |
| 2014/0174382 | A1 * | 6/2014 | Oohigashi | F24H 8/00 122/18.4 |
| 2015/0300661 | A1 * | 10/2015 | Park | F24H 1/523 237/8 R |
| 2016/0377320 | A1 * | 12/2016 | Kim | F24H 8/00 165/140 |

FOREIGN PATENT DOCUMENTS

| | | | |
|---|---|---|---|
| KR | 10-2009-0085962 A | 8/2009 | |
| KR | 10-2010-0066633 A | 6/2010 | |
| WO | WO-0144727 A1 * | 6/2001 | ............. F24H 1/124 |
| WO | WO 0250480 A1 * | 6/2002 | ............... F24H 1/30 |
| WO | WO 2005071343 A1 * | 8/2005 | ............... F24H 1/38 |

* cited by examiner

LATENT-HEAT EXCHANGER FOR HOT-WATER HEATING AND CONDENSING GAS BOILER INCLUDING SAME

CROSS-REFERENCE TO RELATED APPLICATIONS

This application is a continuation application of International Application No. PCT/KR2015/002459 filed on Mar. 13, 2015, which claims priority to Korean Application No. 10-2014-0031092 filed on Mar. 17, 2014. The applications are incorporated herein by reference.

TECHNICAL FIELD

The present disclosure relates to a latent-heat exchanger for hot-water heating and a condensing gas boiler including the same, and more particularly, to a latent-heat exchanger for hot-water heating capable of rapidly supplying hot water by preheating direct water using the latent-heat exchanger, improving heat transfer efficiency by collecting latent heat from combustion exhaust gas which is discharged, reducing manufacturing costs by improving a structure of the latent-heat exchanger, and improving heat transfer efficiency by increasing a heat transfer area, and a condensing gas boiler including the same.

BACKGROUND ART

Generally, a boiler is installed in a variety of buildings including homes, offices, factories and the like, and supplies hot water and heating water through a heat exchange between water and a heat source generated by burning a mixture of air and a gas.

For this purpose, the boiler includes a fuel supplier which receives each of air and a gas from an outside and mixes the air with the gas to supply a mixed fuel to a burner, the burner receives the mixed fuel from the fuel supplier and generates a flame by burning the mixed fuel, and a heat exchanger which exchanges heat between circulating heating water and a heat source supplied from the burner to heat the circulating heating water as heating water.

Recently, a condensing heat exchanger, which is provided with a sensible heat exchanger primarily exchanging heat between circulating heating water and sensible heat generated at a burner and a latent-heat exchanger secondarily exchanging heat between the circulating heating water and combustion gas undergoing heat exchange in the sensible heat exchanger, is widely used, and a boiler provided with such a condensing heat exchanger is referred to as a condensing boiler.

Also, a boiler for heating and hot water being used in a home may be classified into an oil boiler and a gas boiler according to fuel that is used, and of those the gas boiler which is convenient to use and generates less air pollution is mainly used.

Figure 1:
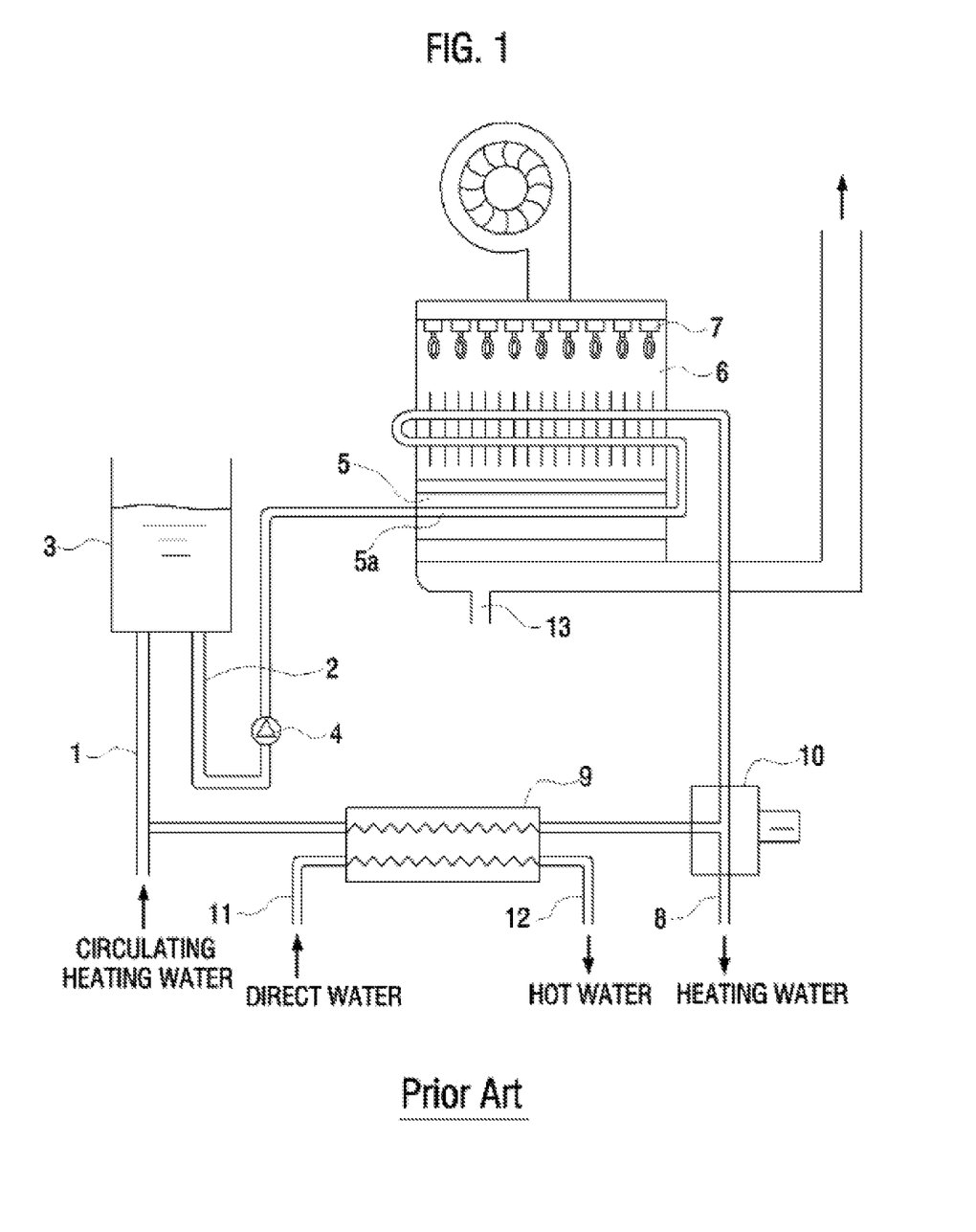
FIG. 1 is a schematic block diagram of a conventional condensing gas boiler.

FIG. 1 is a diagram illustrating a downstream type condensing gas boiler among conventional condensing gas boilers. As shown in FIG. 1, the conventional condensing gas boiler is configured with an expansion tank 3 in which a circulating heating water inflow pipe 1 and a circulating heating water discharge pipe 2 are connected to a lower part portion thereof and storing circulating heating water that flows in through a circulating heating water inflow pipe 1, a circulating pump 4 circulating the circulating heating water discharged through the circulating heating water discharge pipe 2 connected to the expansion tank 3, a latent-heat exchanger 5 in which the circulating heating water, which is pumped by the circulating pump 4, exchanges heat with latent heat, which is generated when condensed water is created due to a temperature decrease of combustion gas while passing through a heat exchange pipe 5a installed at the latent-heat exchanger 5, a sensible-heat exchanger 6 transferring heat energy of a burner 7 to the circulating heating water that is primarily preheated through the latent-heat exchanger 5, a three way valve 10 supplying the heating water to a heating water supply pipe 8 when a heating operation is performed and to a hot water heat exchanger 9 when a hot water supplying operation is performed, and the hot water heat exchanger 9 heating direct water to supply hot water to a user when the hot water supplying operation is performed.

By looking at an operation process of the conventional condensing gas boiler shown in FIG. 1, circulating heating water losing heat to a heating required zone flows in the expansion tank 3 by passing through the circulating heating water inflow pipe 1, and the circulating heating water, which passes through the expansion tank 3 to be discharged to the circulating heating water discharge pipe 2, is supplied to the latent-heat exchanger 5 via the circulating pump 4, exchanges heat with latent heat, which is generated when condensed water is created due to a temperature decrease of combustion gas while passing a heat exchange pipe 5a installed at the latent-heat exchanger 5, and primarily rises in temperature.

Also, the circulating heating water rising in temperature at the latent-heat exchanger 5 secondarily exchanges heat with the combustion gas through the sensible-heat exchanger 6 to rise in temperature. At this point, the condensed water being created is discharged to the outside through a condensed water drain path 13.

Meanwhile, the circulating heating water being secondarily heated at the sensible heat exchanger 6 is supplied to a heating required zone through a heating water supply pipe 8. At this point, the three way valve 10 is provided at the heating water supply pipe 8 and the heating water is supplied to the hot water heat exchanger 9 through the three way valve 10 to heat direct water flowing in through a direct-water inflow pipe 11 into hot water, and then the hot water is discharged through a hot water outlet pipe 12 or is supplied to the heating required zone to provide heat thereto.

However, the conventional condensing gas boiler configured as described above heats direct water into hot water only using heating water such that there are problems in that a long time is necessary to heat the direct water and also an excessive amount of heat is consumed to heat the direct water into the hot water.

Also, a cross section of the heat exchange pipe 5a, which is connected to the circulating heating water discharge pipe 2 so that the circulating heating water undergoes a heat exchange while moving therethrough, has a circular shape such that there is a problem in that a heat transfer area at which heat is exchanged between the circulating heating water and latent heat is small and thus heat transfer efficiency is dramatically degraded.

In addition, even though a plurality of heat exchange pipes 5a are configured to increase a heat transfer area, there is a problem in that an increase of the number of the heat exchange pipe 5a is restricted due to a limitation of a dimension of the latent-heat exchanger.

SUMMARY

To address the above described problems, an object of the present disclosure is to provide a latent-heat exchanger for hot-water heating capable of rapidly supplying hot water by preheating direct water using the latent-heat exchanger, improving heat transfer efficiency by collecting latent heat from combustion exhaust gas being discharged, reducing manufacturing costs by improving a structure of the latent-heat exchanger, and improving heat transfer efficiency by increasing a heat transfer area, and a condensing gas boiler including the same.

To attain the above described object of the present disclosure, a latent-heat exchanger for hot-water heating, which heats circulating heating water using combustion gas generated due to ignition and combustion of a burner, is provided including an upper heat exchange unit including a plurality of circulating-heating-water heat exchange units and a combustion gas flow channel, wherein the circulating-heating-water heat exchange units are arranged to be adjacent to each other and connected to each other and a circulating-heating-water flow channel is formed therein to allow circulating heating water to move therethrough, and the combustion gas flow channel is formed between each of the circulating-heating-water heat exchange units to allow combustion gas to move therethrough; and a lower heat exchange unit located below the upper heat exchange unit and including a plurality of direct-water heat exchange units and a combustion gas flow channel, wherein the direct-water heat exchange units are arranged to be adjacent to each other and connected to each other and a direct-water flow channel is formed therein to allow direct water to move therethrough, and the combustion gas flow channel is formed between each of the direct-water heat exchange units to allow the combustion gas to move therethrough.

Also, each of the circulating-heating-water heat exchange units and each of the direct-water heat exchange units may be formed by stacking two plates.

In addition, a lower end of each of the circulating-heating-water heat exchange units and an upper end of each of the direct-water heat exchange units may be connected to each other through braze welding.

Further, the circulating-heating-water heat exchange unit and the direct-water heat exchange unit may be integrally formed by stacking two plates.

Additionally, an irregular portion is formed at an outer lateral surface of each of the plates to increase a heat transfer area.

To attain another object described above of the present disclosure, a condensing gas boiler, which applies heat to circulating heating water using combustion gas generated due to ignition and combustion of a burner, is provided including a latent-heat exchanger; a circulating heating water outlet pipe configured to flow circulating heating water discharged from an expansion tank into the latent-heat exchanger; a direct-water inflow pipe configured to flow direct water into the latent-heat exchanger; a heating water inflow pipe configured to flow hot water heated through the latent-heat exchanger into a sensible heat exchanger; a hot water discharge pipe configured to discharge the hot water heated through the latent-heat exchanger; and a hot water heat exchanger configured to receive the hot water through the hot water discharge pipe to reheat the hot water.

As described above, the latent-heat exchanger for hot-water heating and the condensing gas boiler including the same of the present disclosure have an effect capable of increasing a heat transfer area, at which a heat exchange is performed between the circulating heating water or the direct water and the combustion gas, and improving heat transfer efficiency by longitudinally configuring a plurality of circulating-heating-water heat exchange units, through which the circulating heating water moves to exchange heat with the combustion gas, and a plurality of direct-water heat exchange units, through which the direct water moves to exchange heat, as two columns and increasing the number of each of the circulating-heating-water heat exchange unit and the direct-water heat exchange unit greater than that of each thereof used in configuring the latent-heat exchanger.

Also, by forming the combustion gas flow channel between each of the plurality of circulating-heating-water heat exchange units and between each of the plurality of direct-water heat exchange units as well as by arranging the circulating-heating-water heat exchange units to be adjacent to each other and connected to each other and by connecting the direct-water heat exchange units to be arranged below and adjacent to the circulating-heating-water heat exchange units, when the circulating heating water or the direct water exchanges heat with the combustion gas passing through the combustion gas flow channel while moving through the circulating-heating-water heat exchange units or the direct-water heat exchange units, the circulating heating water or the direct water exchanges heat with the combustion gas passing through both sides of each of the circulating-heating-water heat exchange units or the direct-water heat exchange units, and thus the circulating heating water or the direct water exchanges heat with the combustion gas through two plates so that there is an effect in which a heat transfer area is increased and heat transfer efficiency is improved.

In addition, by primarily preheating the direct water in advance using the latent-heat exchanger, there is an effect in which a time necessary to heat the direct water into the hot water using the heating water is shortened and an amount of heat used in heating the direct water is reduced.

Further, by coupling two plates to configure a single heat exchanger, there is an effect in which a manufacturing process is simplified and manufacturing costs are reduced.

DETAILED DESCRIPTION

Hereinafter, a latent-heat exchanger for hot-water heating and a condensing gas boiler including the same according to one embodiment of the present disclosure will be described in detail with reference to the accompanying drawings.

Figure 2:
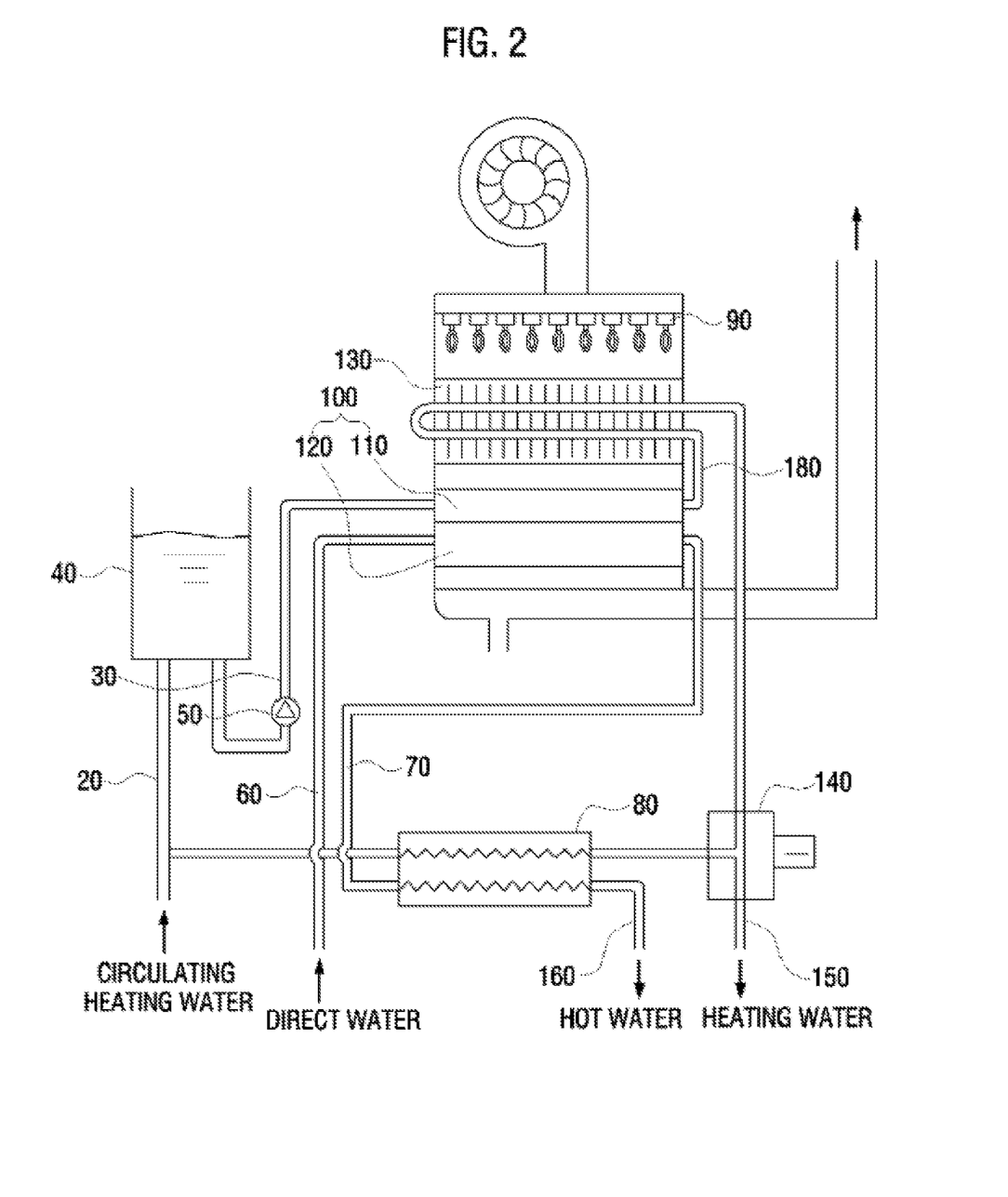
FIG. 2 is a schematic block diagram of a condensing gas boiler according to the present disclosure.

FIG. 2 is a schematic block diagram of a condensing gas boiler according to the present disclosure.

As shown in FIG. 2, a condensing gas boiler according to the present disclosure is configured with an expansion tank 40 storing circulating heating water flowing in through a circulating heating water inflow pipe 20, a circulating pump 50 circulating heating water discharged from the expansion tank 40 through a circulating heating water outlet pipe 30, a latent-heat exchanger 100 exchanging latent heat, which is generated when condensed water is created due to a temperature decrease of combustion gas, with the circulating heating water and direct water, wherein the circulating heating water is pumped by the circulating pump 50 and the direct water flows in through a direct-water inflow pipe 60, a sensible heat exchanger 130 transferring heat energy of a burner 90 to heating water being primarily preheated through the latent-heat exchanger 100, a heating water inflow pipe 180 supplying the heating water primarily preheated through the latent-heat exchanger 100 to the sensible heat exchanger 130, a three way valve 140 supplying the heating water to a heating water supply pipe 150 when a heating operation is performed and to a hot water heat exchange unit 80 when a hot water supply operation is performed, the direct-water inflow pipe 60 supplying the direct water to the latent-heat exchanger 100, a hot water discharge pipe 70 directing the hot water heated through the latent-heat exchanger 100 to flow in the hot water heat exchange unit 80, and a hot water supply pipe 160 supplying the hot water that is reheated through the hot water heat exchange unit 80.

Therefore, the circulating heating water and the direct water flow in the latent-heat exchanger 100 through the circulating heating water outlet pipe 30 and the direct-water inflow pipe 60, respectively, and are primarily preheated. Subsequently, the circulating heating water flows in the sensible heat exchanger 130 to be reheated, and hot water exchanges heat with the heating water to be heated into hot water while passing through the hot water heat exchange unit 80 via the hot water discharge pipe 70.

In the present disclosure, direct water is not only heated by the heating water but is primarily preheated by passing through the latent-heat exchanger 100 such that a time necessary to heat the direct water into the hot water is shortened and also an amount of heat consumed to heat the direct water is saved.

Figure 3:
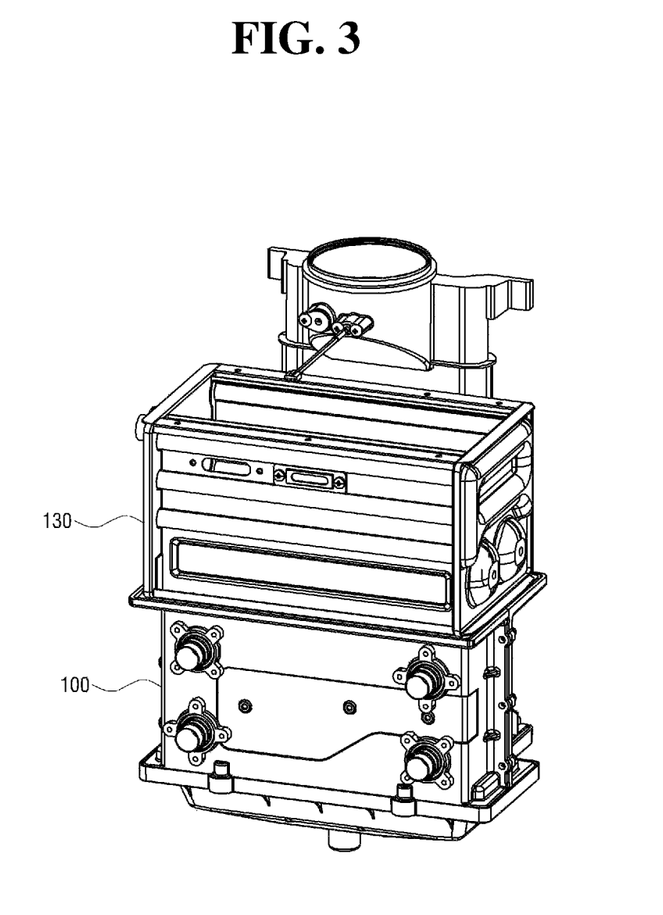
FIG. 3 is a perspective view of a heat exchanger of the condensing gas boiler according to the present disclosure.
Figure 4:
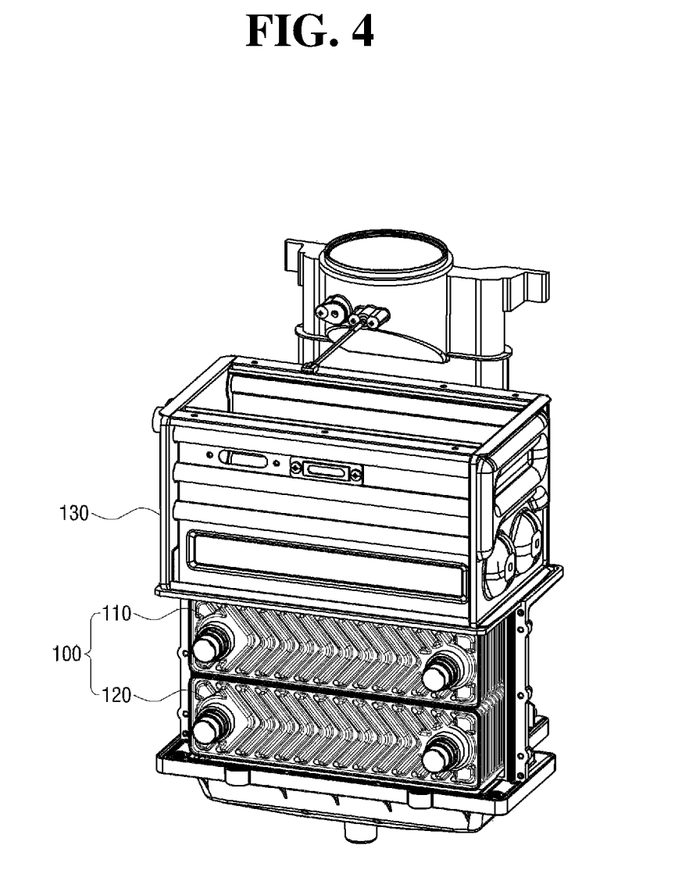
FIG. 4 is an exploded perspective view illustrating a state in which a latent-heat exchanger is provided inside the condensing gas boiler according to the present disclosure.
Figure 5:
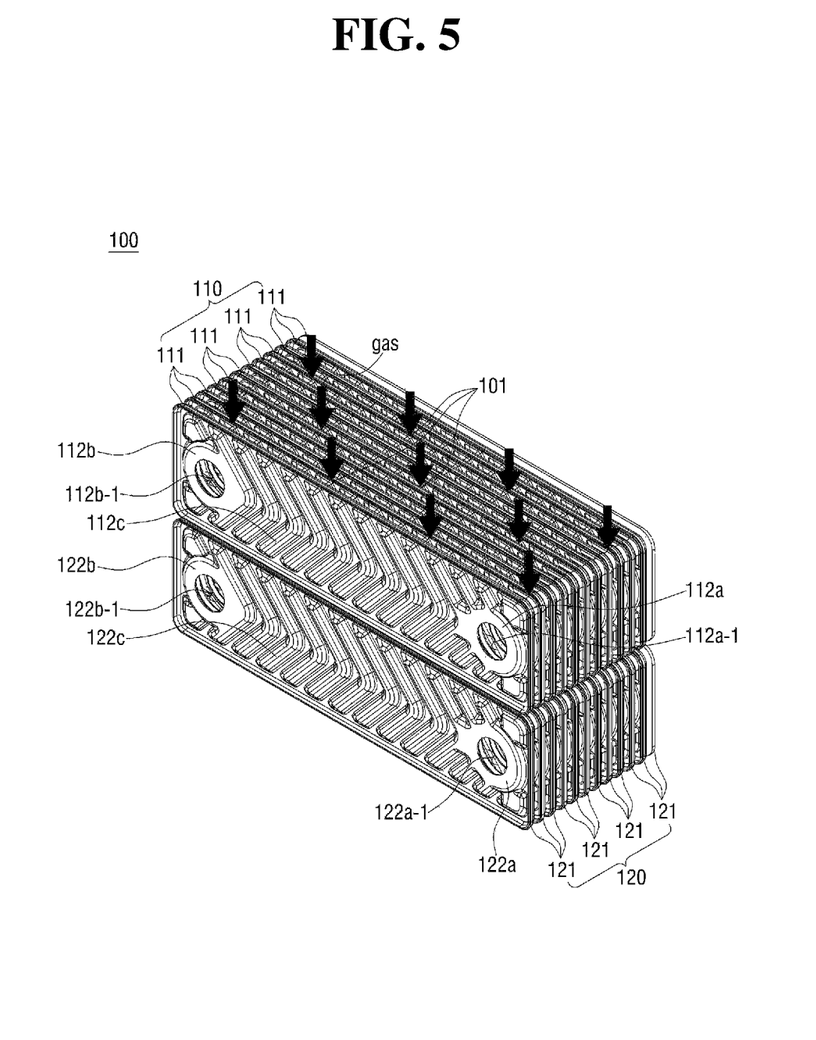
FIG. 5 is a perspective view of the latent-heat exchanger employed in the condensing gas boiler according to the present disclosure.

Meanwhile, FIG. 3 is a perspective view of a heat exchanger of a condensing gas boiler according to the present disclosure, FIG. 4 is an exploded perspective view illustrating a state in which a latent-heat exchanger is provided inside the condensing gas boiler according to the present disclosure, and FIG. 5 is a perspective view of the latent-heat exchanger employed in the condensing gas boiler according to the present disclosure.

As shown in FIGS. 3 to 5, the latent-heat exchanger 100 is configured with an upper heat exchange unit 110 in which circulating heating water moves and exchanges heat with combustion gas, and a lower heat exchange unit 120 in which direct water moves and exchanges heat with the combustion gas.

The upper heat exchange unit 110 includes a plurality of circulating-heating-water heat exchange units 111 arranged to be adjacent to each other and connected to each other through braze welding or the like, and a combustion gas flow channel 101 formed between each of the circulating-heating-water heat exchange units 111 to allow the combustion gas to pass through the combustion gas flow channel 101.

The lower heat exchange unit 120 includes a plurality of direct-water heat exchange units 121 arranged to be adjacent to each other and connected to each other through braze welding or the like, and the combustion gas flow channel 101 formed between each of the direct-water heat exchange units 121 to allow the combustion gas to pass through the combustion gas flow channel 101.

Figure 6A:
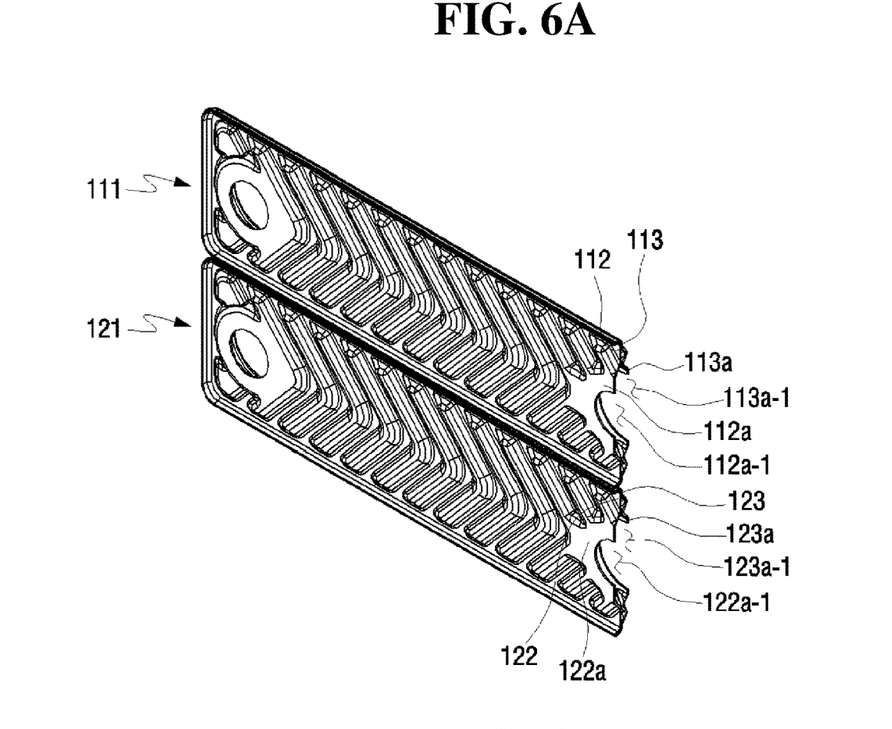
FIG. 6A is a perspective view illustrating a circulating heating water inlet and a circulating heating water outlet which are formed at a circulating-heating-water heat exchange unit and a direct-water inlet and a direct-water outlet which are formed at a direct-water heat exchange unit.
Figure 6B:
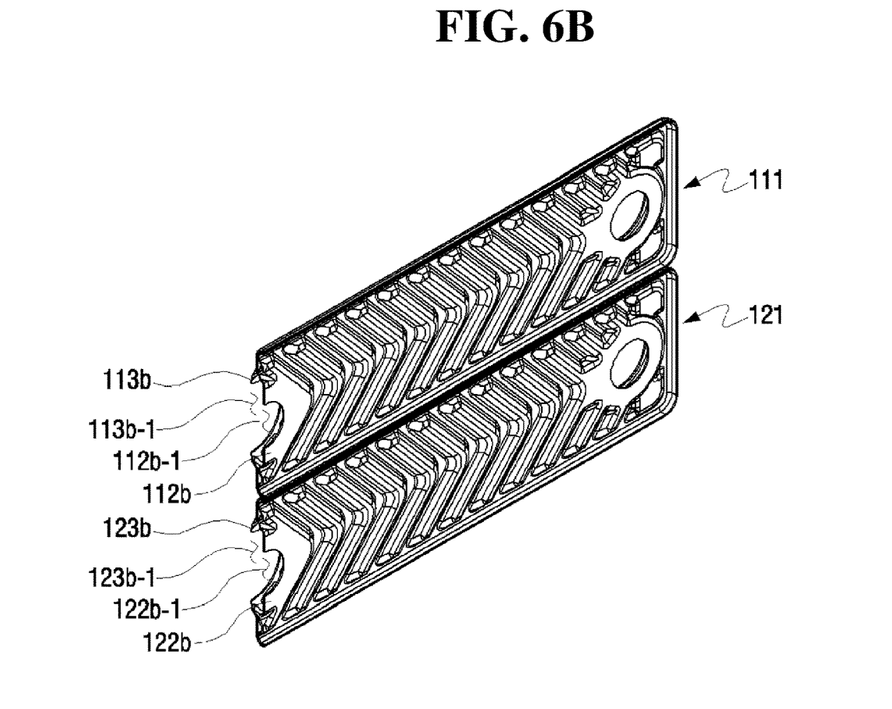
FIG. 6B is a perspective view illustrating a heating water inlet and a heating water outlet which are formed at the circulating-heating-water heat exchange unit and a hot water inlet and a hot water outlet which are formed at the direct-water heat exchange unit.

Meanwhile, FIG. 6A is a perspective view illustrating a circulating heating water inlet and a circulating heating water outlet, which are formed at a circulating-heating-water heat exchange unit, and a direct-water inlet and a direct-water outlet, which are formed at a direct-water heat exchange unit, and FIG. 6B is a perspective view illustrating a heating water inlet and a heating water outlet, which are formed at the circulating-heating-water heat exchange unit, and a hot water inlet and a hot water outlet, which are formed at the direct-water heat exchange unit.

As shown in FIG. 6, each of the circulating-heating-water heat exchange units 111 configuring the upper heat exchange unit 110 is formed by stacking two plates 112 and 113, that is, a first circulating-heating-water heat exchange unit plate 112 and a second circulating-heating-water heat exchange unit plate 113 that are made of a stainless material and a circulating-heating-water flow channel 111a is formed inside each of the circulating-heating-water heat exchange units 111 to allow circulating heating water to exchange heat with combustion gas passing through the combustion gas flow channel 101 formed between the circulating-heating-water heat exchange units 111 while the circulating heating water moves.

A circulating heating water inlet 112a is formed at one side of the first circulating-heating-water heat exchange unit plate 112 to allow circulating heating water moving through the circulating heating water outlet pipe 30 to flow inside the circulating-heating-water heat exchange unit 111, and a circulating heating water inlet hole 112a-1 is formed at the circulating heating water inlet 112a, and thus the circulating heating water passes through the circulating heating water inlet hole 112a-1 to flow inside the circulating-heating-water heat exchange unit 111.

Also, a heating water outlet 112b is formed at the other side of the first circulating-heating-water heat exchange unit plate 112 to discharge heating water to an outside of the circulating-heating-water heat exchange unit 111, wherein the heating water rises in temperature by exchanging heat with combustion gas while moving through the circulating-heating-water flow channel 111a formed inside the circulating-heating-water heat exchange unit 111. And, a heating water outlet hole 112b-1 is formed at the heating water outlet 112b, and thus the heating water which has risen in temperature passes through the heating water outlet hole 112b-1 to be discharged to the outside of the circulating-heating-water heat exchange unit 111.

Meanwhile, a circulating heating water outlet 113a is formed at one side of the second circulating-heating-water heat exchange unit plate 113 to discharge a portion of the circulating heating water, which does not move through the circulating-heating-water flow channel 111a, flowing in through the circulating heating water inlet 112a to the outside of the circulating-heating-water heat exchange unit 111. A circulating heating water outlet hole 113a-1 is formed at the circulating heating water outlet 113a, and thus the circulating heating water passes through the circulating heating water outlet hole 113a-1 to be discharged to the outside of the circulating-heating-water heat exchange unit 111.

Also, a heating water inlet 113b is formed at the other side of the second circulating-heating-water heat exchange unit plate 113 to allow the heating water which has risen in temperature to flow inside the circulating-heating-water heat exchange unit 111. And, a heating water inlet hole 113b-1 is formed at the heating water inlet 113b, and thus the heating water passes through the heating water inlet hole 113b-1 to flow in the circulating-heating-water heat exchange unit 111, and then is discharged to the outside through the heating water outlet hole 112b-1 formed at the heating water outlet 112b.

In addition, an irregular portion 112c is formed at an outer lateral surface of each of the plates 112 and 113 along a length direction of the circulating-heating-water heat exchange unit 111 to increase a heat transfer area between the heating water or the direct water and the combustion gas to improve heat transfer efficiency.

Meanwhile, the lower heat exchange unit 120 includes the plurality of direct-water heat exchange units 121 arranged to be adjacent to each other and connected to each other through braze welding or the like, and the combustion gas flow channel 101 formed between each of the direct-water heat exchange units 121 to allow combustion gas to pass through the combustion gas flow channel 101.

Each of the direct-water heat exchange units 121 configuring the lower heat exchange unit 120 is formed by stacking two plates of a first direct-water heat exchange plate 122 and a second direct-water heat exchange plate 123 which are made of a stainless material the same as that of the circulating-heating-water heat exchange unit 111, and a direct-water flow channel 121a is formed inside each of the direct-water heat exchange units 121 to allow direct water to exchange heat with combustion gas while the direct water moves.

A direct-water inlet 122a is formed at one side of the first direct-water heat exchange plate 122 to allow direct water flowing through the direct-water inflow pipe 60 to flow inside the direct-water heat exchange unit 121, and a direct-water inlet hole 122a-1 is formed at the direct-water inlet 122a, and thus the direct water passes through the direct-water inlet hole 122a-1 to flow inside the direct-water heat exchange unit 121.

Also, a hot water outlet 122b is formed at the other side of the first direct-water heat exchange plate 122 to discharge hot water to an outside of the direct-water heat exchange unit 121, wherein the hot water has risen in temperature by exchanging heat with combustion gas while moving through the direct-water flow channel 121a formed inside the direct-water heat exchange unit 121. And, a hot water outlet hole 122b-1 is formed at the hot water outlet 122b, and thus the hot water passes through the hot water outlet hole 122b-1 to be discharged to the outside of the direct-water heat exchange unit 121.

Meanwhile, a direct-water outlet 123a is formed at one side of the second direct-water heat exchange plate 123 to discharge a portion of the direct water, which does not move through the direct-water flow channel 121a, flowing in through the direct-water inlet 122a to the outside of the direct-water heat exchange unit 121. And, a direct-water outlet hole 123a-1 is formed at the direct-water outlet 123a, and thus the direct water passes through the direct-water outlet hole 123a-1 to be discharged to the outside of the direct-water heat exchange unit 121.

Also, a hot water inlet 123b is formed at the other side of the second direct-water heat exchange plate 123 to allow the hot water which has risen in temperature to flow in the direct-water heat exchange unit 121, and a hot water inlet hole 123b-1 is formed at the hot water inlet 123b, and thus the hot water passes through the hot water inlet hole 123b-1 and flows in the direct-water heat exchange unit 121 to be discharged to the outside of the direct-water heat exchange unit 121 through the hot water outlet hole 122b-1 formed at the hot water outlet 122b.

In addition, an irregular portion 122c is formed at an outer lateral surface of each of the plates 122 and 123 along a length direction of the direct-water heat exchange unit 121 to increase a heat transfer area between the direct water and the combustion gas to improve heat transfer efficiency.

Therefore, the upper heat exchange unit 110 is formed at an upper part of the latent-heat exchanger 100, wherein the upper heat exchange unit 110 is configured with the plurality of circulating-heating-water heat exchange units 111 arranged to be adjacent to each other and connected to each other and in which the circulating heating water moves, and the lower heat exchange unit 120 is formed at a lower part of the latent-heat exchanger 100, wherein the lower heat exchange unit 120 is configured with the plurality of direct-water heat exchange units 121 arranged to be adjacent to each other and connected to each other and in which the direct water moves. Consequently, the circulating heating water moving through the circulating heating water outlet pipe 30 primarily rises in temperature through a heat exchange with the combustion gas passing between the circulating-heating-water heat exchange units 111 while passing through the upper heat exchange unit 110, and then is provided to the sensible heat exchanger 130 through the heating water inflow pipe 180. In addition, the direct water moving through the direct-water inflow pipe 60 primarily rises in temperature through a heat exchange with the combustion gas passing between the direct-water heat exchange units 121 while passing through the lower heat exchange unit 120, is provided to the hot water heat exchange unit 80 via the hot water discharge pipe 70, and then secondarily rises in temperature through the hot water heat exchange unit 80.

In the present disclosure having the configuration as described above, the plurality of circulating-heating-water heat exchange units 111 in which the circulating heating water exchanges heat with the combustion gas while moving therethrough, and the plurality of direct-water heat exchange units 121 in which the direct water exchanges heat with the combustion gas while moving therethrough are longitudinally configured as two columns As a result, the number of each of the circulating-heating-water heat exchange unit 111 and the direct-water heat exchange unit 121 is greater than that of each thereof being used in configuring the latent-heat exchanger 100, thereby increasing a heat transfer area at which the circulating heating water or the direct water exchanges heat with the combustion gas and improving heat transfer efficiency.

Also, by forming the combustion gas flow channel 101 between each of the circulating-heating-water heat exchange units 111 and between each of the direct-water heat exchange units 121 as well as by arranging the circulatingheating-water heat exchange units 111 to be adjacent to each other and connected to each other and arranging the direct-water heat exchange units 121 to be adjacent to each other and connected to each other, when the circulating heating water and the direct water exchange heat with combustion gas passing through the combustion gas flow channel 101 while moving through the circulating-heating-water heat exchange units 111 and the direct-water heat exchange units 121, they exchange heat with the combustion gas passing through both ends of each of the heat exchangers 111 and 121 such that the heat exchange between the circulating heating water or the direct water and the combustion gas is performed through the two plates 112 and 113 or 122 and 123, thereby increasing a heat transfer area and improving heat transfer efficiency.

Further, by coupling the two plates 112 and 113 or 122 and 123 to each other to configure a single heat exchanger 111 or 121, a manufacturing process is simplified and manufacturing costs are reduced.

Figure 10:
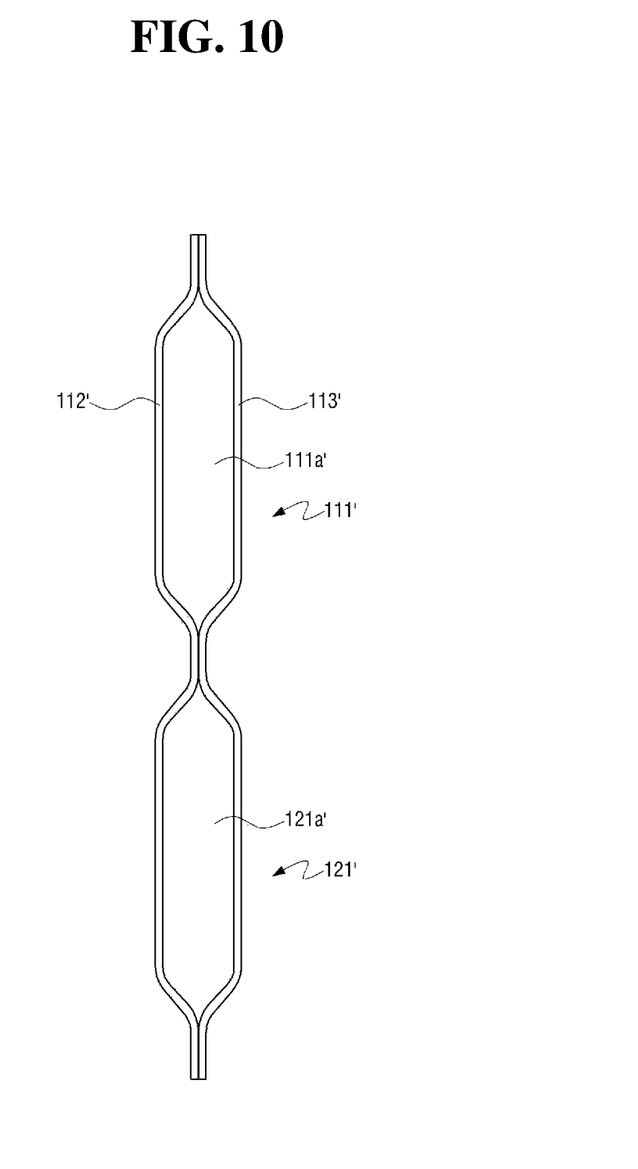
FIG. 10 is a schematic diagram illustrating another embodiment of a latent-heat exchanger employed in the condensing gas boiler according to the present disclosure.

Meanwhile, FIG. 10 is a schematic diagram illustrating another embodiment of a latent-heat exchanger employed in the condensing gas boiler according to the present disclosure.

As shown in FIG. 10, a lower end of each of the circulating-heating-water heat exchange units 111 and an upper end of each of the direct-water heat exchange units 121 are connected to each other through braze welding. On the other hand, without separately configuring the circulating-heating-water heat exchange unit 111 and the direct-water heat exchange unit 121, two large-area plates 112' and 113' may be stacked to form a circulating-heating-water flow channel 111a' at the upper part and a direct-water flow channel 121a' at the lower part, and thus a circulating-heating-water heat exchange unit 111' and a direct-water heat exchange unit 121' may be integrally configured. With such a configuration, damage to a welded connecting portion due to external impact or long-term use of a boiler may be prevented when the circulating-heating-water heat exchange unit 111 and the direct-water heat exchange unit 121 are connected to each other through welding.

Figure 7:
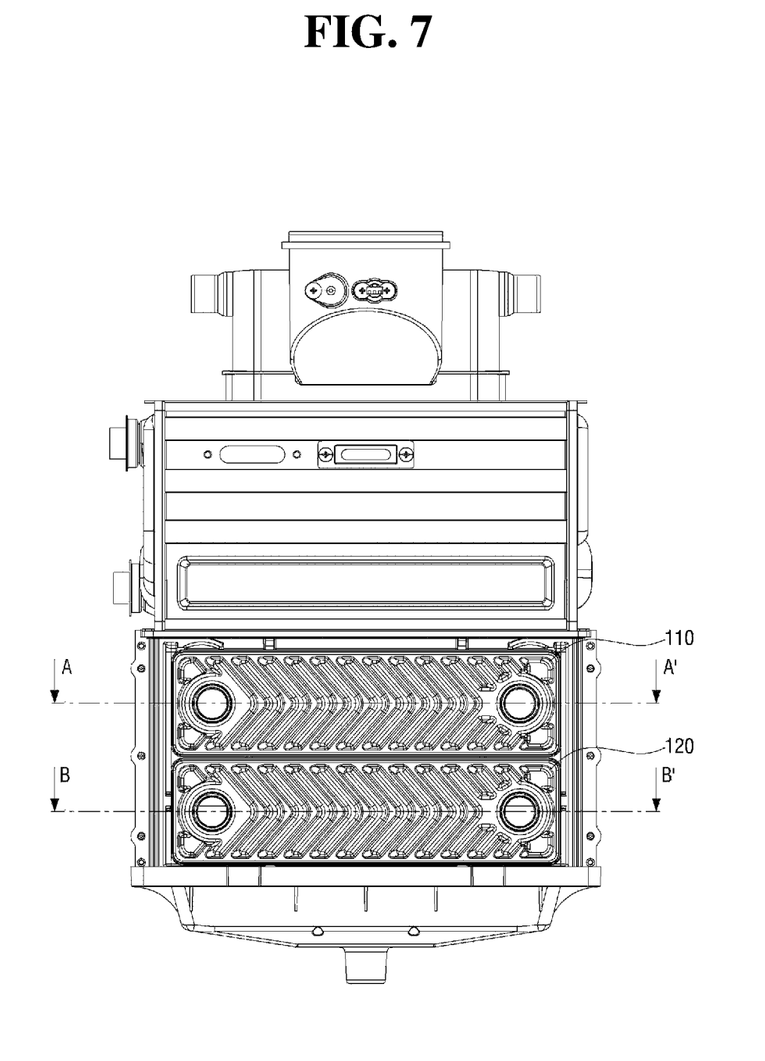
FIG. 7 is a lateral view of the latent-heat exchanger employed in the condensing gas boiler according to the present disclosure.
Figure 8:
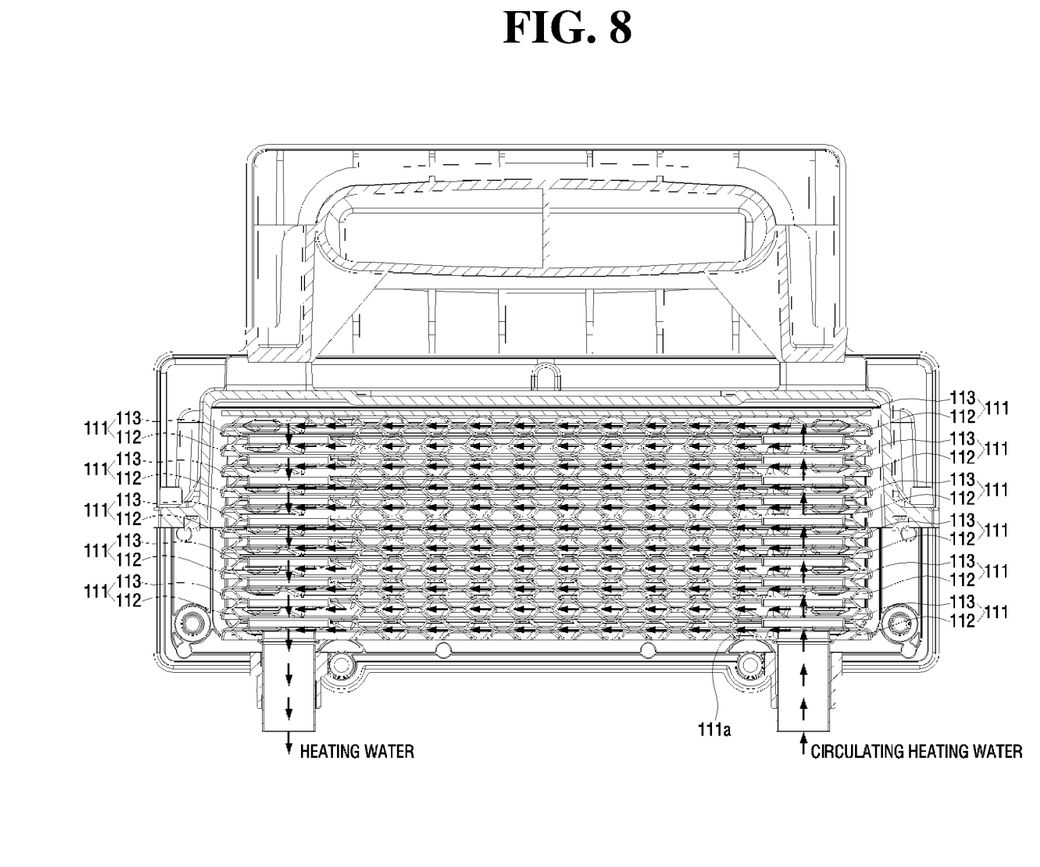
FIG. 8 is a cross-sectional view taken along line A-A' of FIG. 7.
Figure 9:
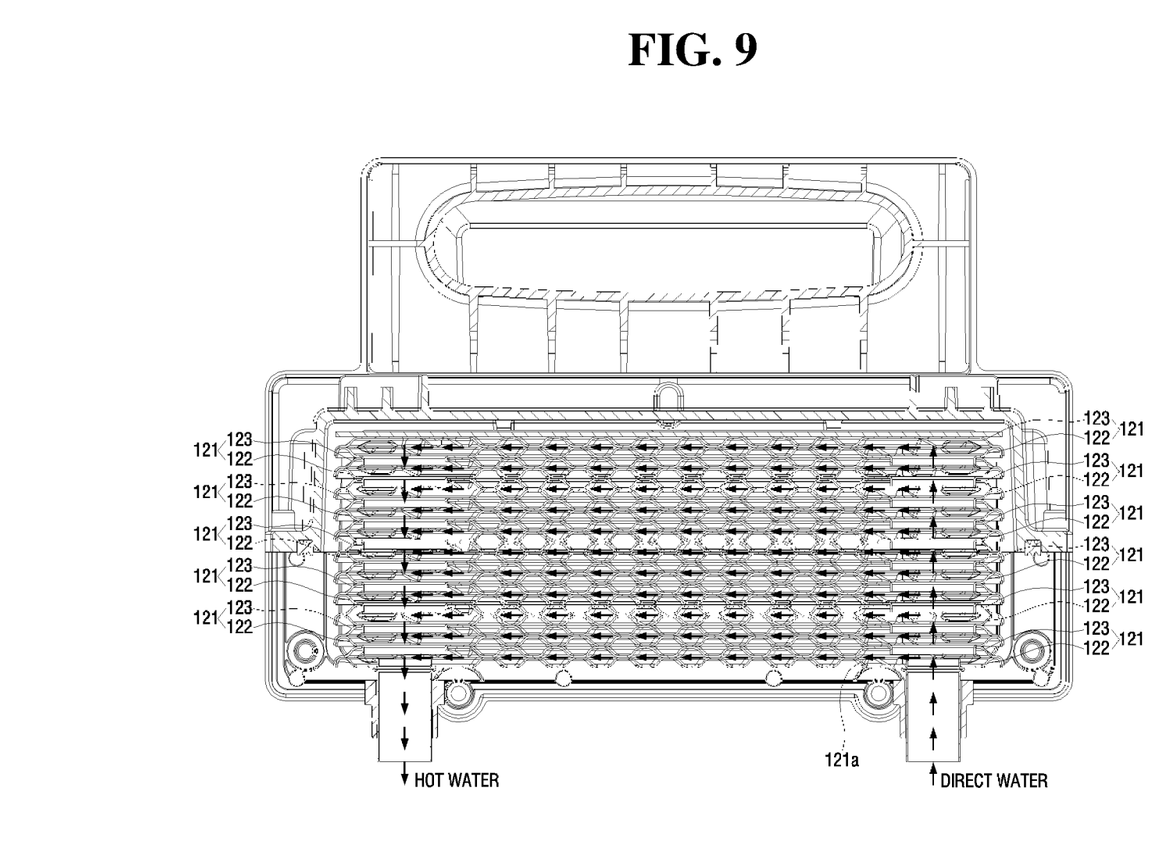
FIG. 9 is a cross-sectional view taken along line B-B' of FIG. 7.

Hereinafter, a heat exchange process while circulating heating water and direct water move in a latent-heat exchanger included in the condensing boiler according to the present disclosure will be described in detail with reference to FIGS. 7 to 9.

Firstly, circulating heating water, which moves through the circulating heating water outlet pipe 30, flows in the plurality of circulating-heating-water heat exchange units 111 configuring the upper heat exchange unit 110, wherein the circulating heating water flows inside a first circulating-heating-water heat exchange unit 111 among the plurality of circulating-heating-water heat exchange units 111 by passing through the circulating heating water inlet hole 112a-1 formed at the circulating heating water inlet 112a of the first circulating-heating-water heat exchange unit 111.

While passing through the circulating-heating-water flow channel 111a, a portion of the circulating heating water flowed inside the first circulating-heating-water heat exchange unit 111 exchanges heat with combustion gas that is passing between each of the circulating-heating-water heat exchange units 111. At this point, the portion of the circulating heating water exchanges heat with condensation latent heat generated when condensed water is created due to a temperature decrease of the combustion gas.

The heating water, which has risen in temperature through a heat exchange with the condensation latent heat, passes through the heating water outlet hole 112b-1 formed at the heating water outlet 112b to be supplied to the sensible heat exchanger 130 via the heating water inflow pipe 180 connected to the heating water outlet 112b.

Also, the remaining of the circulating heating water, which does not move through the circulating-heating-water flow channel 111a, moves toward a second circulating-heating-water heat exchange unit 111. A portion of the remaining circulating heating water exchanges heat with the combustion gas while moving through a circulating-heating-water flow channel 111a, and then passes through the heating water outlet hole 112b-1 via the heating water inlet hole 113b-1 formed at the heating water inlet 113b of the first circulating-heating-water heat exchange unit 111, and then is provided to the sensible heat exchanger 130 through the heating water inflow pipe 180. Another portion of the remaining circulating heating water moves toward a subsequent circulating-heating-water heat exchange unit 111 to repeat the above described process.

Meanwhile, direct water, which moves through the direct-water inflow pipe 60, flows in the lower heat exchange unit 120 located below the upper heat exchange unit 110. The direct water passes through the direct-water inlet hole 122a-1 formed at a direct-water inlet 122a of the first direct-water heat exchange unit 121 to flow in the first direct-water heat exchange unit 121. While moving through the direct-water flow channel 121a, a portion of the direct water, which flowed in the first direct-water heat exchange unit 121, exchanges heat with combustion gas passing through the combustion gas flow channel 101 formed between each of the direct-water heat exchange units 121. At this point, the direct water also exchanges heat with condensation latent heat generated when condensed water is created due to a temperature decrease of the combustion gas.

The hot water, which has risen in temperature through a heat exchange with the condensation latent heat, passes through the hot water outlet hole 122b-1 formed at the hot water outlet 122b to be discharged to the outside, and then is provided to the hot water heat exchange unit 80 via the hot water discharge pipe 70 connected to the hot water outlet 122b.

The remaining direct water, which does not move through the direct-water flow channel 121a, moves toward a second direct-water heat exchange unit 121. A portion of the remaining direct water exchanges heat with the combustion gas to rise in temperature and then passes through the hot water outlet hole 122b-1 formed at the hot water outlet 122b via the hot water inlet hole 123b-1 formed at the hot water inlet 123b of the first direct-water heat exchange unit 121, and then is provided to the hot water heat exchange unit 80 through the hot water discharge pipe 70. Another portion of the remaining direct water is provided to a subsequent direct-water heat exchange unit 121 to repeat the above described process.

Through such a process described above, the circulating heating water primarily rises in temperature through the upper heat exchange unit 110 formed at the upper part of the latent-heat exchanger 100 and then is provided to the sensible heat exchanger 130 to secondarily rise in temperature, and the direct water primarily rises in temperature through the lower heat exchange unit 120 formed at the lower part of the latent-heat exchanger 100 and then is provided to the hot water heat exchange unit 80 to secondarily rise in temperature.

Although one preferred embodiment of the present disclosure has been described above, it should be understood that modifications, alterations, and equivalents can be apparently devised and applied. Therefore, it should be understood that the description disclosed herein is not taken as limiting the scope of the present disclosure defined by the appended claims.

The invention claimed is:

1. A latent-heat exchanger for hot-water heating, which heats circulating heating water using combustion gas generated due to ignition and combustion of a burner, comprising:
    an upper heat exchange unit including a plurality of circulating-heating-water heat exchange units and a combustion gas flow channel, wherein the circulating-heating-water heat exchange units are arranged to be adjacent to each other and connected to each other and a circulating-heating-water flow channel is formed therein to allow circulating heating water to move therethrough, and the combustion gas flow channel is formed between each of the circulating-heating-water heat exchange units to allow combustion gas to move therethrough; and
    a lower heat exchange unit located below the upper heat exchange unit and including a plurality of direct-water heat exchange units and a combustion gas flow channel, wherein the direct-water heat exchange units are arranged to be adjacent to each other and a direct-water flow channel is formed therein to allow direct water to move therethrough, and the combustion gas flow channel is formed between each of the direct-water heat exchange units to allow the combustion gas to move therethrough,
    wherein the circulating-heating-water heat exchange units and the direct-water heat exchange units are formed integrally by upper and lower portions of two plates stacked forward and backward,
    wherein the circulating-heating-water flow channel is formed at the upper portion of the two plates stacked forward and backward and the direct-water flow channel is formed at the lower portion of the two plates stacked forward and backward,
    wherein the combustion gas passes through the combustion gas flow channel of the upper heat exchange unit and the combustion gas flow channel of the lower heat exchange unit in series to perform heat exchange with the circulating-heating-water and the direct-water, and
    wherein the combustion gas flows through the combustion gas flow channel from the upper heat exchange unit to the lower heat exchange unit.

2. The latent-heat exchanger of claim 1, wherein an irregular portion is formed at an outer lateral surface of each of the plates to increase a heat transfer area.

3. A condensing gas boiler applying heat to circulating heating water using combustion gas generated due to ignition and combustion of a burner, comprising:
    a latent-heat exchanger, comprising:
        an upper heat exchange unit including a plurality of circulating-heating-water heat exchange units and a combustion gas flow channel, wherein the circulating-heating-water heat exchange units are arranged to be adjacent to each other and connected to each other and a circulating-heating-water flow channel is formed therein to allow circulating heating water to move therethrough, and the combustion gas flow channel is formed between each of the circulating-heating-water heat exchange units to allow combustion gas to move therethrough; and
        a lower heat exchange unit located below the upper heat exchange unit and including a plurality of direct-water heat exchange units and a combustion gas flow channel, wherein the direct-water heat exchange units are arranged to be adjacent to each other and connected to each other and a direct-water flow channel is formed therein to allow direct water to move therethrough, and the combustion gas flow channel is formed between each of the direct-water heat exchange units to allow the combustion gas to move therethrough,
        wherein the circulating-heating-water heat exchange units and the direct-water heat exchange units are formed integrally by upper and lower portions of two plates stacked forward and backward,
        wherein the circulating-heating-water flow channel is at the upper portion of the two plates stacked forward and backward and the direct-water flow channel is formed at the lower portion of the two plates stacked forward and backward,
        wherein the combustion gas passes through the combustion gas flow channel of the upper heat exchange unit and the combustion gas flow channel of the lower heat exchange unit in series to perform heat exchange with the circulating-heating-water and the direct-water, and
        wherein the combustion gas flows through the combustion gas flow channel from the upper heat exchange unit to the lower heat exchange unit;
    a circulating heating water outlet pipe configured to flow circulating heating water discharged from an expansion tank into the latent-heat exchanger;
    a direct-water inflow pipe configured to flow direct water into the latent-heat exchanger;
    a heating water inflow pipe configured to flow hot water heated through the latent-heat exchanger into a sensible-heat exchanger;
    a hot water discharge pipe configured to discharge the hot water heated through the latent-heat exchanger; and
    a hot water heat exchanger configured to receive the hot water through the hot water discharge pipe to reheat the hot water.

* * * * *